United States Patent [19]

Niksa et al.

[11] Patent Number: 4,788,111
[45] Date of Patent: Nov. 29, 1988

[54] EFFICIENT ELECTRICAL POWER GENERATION SYSTEM

[75] Inventors: Marilyn J. Niksa, Concord; Kenneth J. Branchick; Thomas R. Turk, both of Mentor, all of Ohio

[73] Assignee: ELTECH Systems Corporation, Boca Raton, Fla.

[21] Appl. No.: 88,314

[22] Filed: Aug. 24, 1987

Related U.S. Application Data

[62] Division of Ser. No. 17,806, Mar. 5, 1987, Pat. No. 4,719,156.

[51] Int. Cl.[4] ............................................. H01M 12/06
[52] U.S. Cl. ......................................... 429/27; 429/14; 429/70; 429/72; 429/51
[58] Field of Search ....................... 429/14, 17, 19, 67, 429/70, 81, 72, 51, 42, 27, 49

[56] References Cited

U.S. PATENT DOCUMENTS

| 3,129,066 | 4/1964 | Ambrogi et al. | 422/140 |
| 3,359,136 | 12/1967 | Merten et al. | 429/81 |
| 3,513,031 | 5/1970 | Zaromb | 429/29 |
| 3,708,345 | 1/1973 | Loos et al. | 429/70 X |
| 4,147,839 | 4/1979 | Solomon et al. | 429/15 |
| 4,246,325 | 1/1981 | de Nora et al. | 429/17 |
| 4,254,190 | 3/1981 | Zaromb | 429/15 |
| 4,308,322 | 12/1981 | Hammar | 429/72 X |
| 4,354,958 | 10/1982 | Solomon | 252/425.3 |

Primary Examiner—Anthony Skapars
Attorney, Agent, or Firm—John J. Freer

[57] ABSTRACT

Batteries comprising an anode and liquid electrolyte produce an electrolyte effluent which may contain a solid particulate discharge. This discharge product inhibits the efficient generation of electrical power by the battery. It has been discovered that this solid particulate discharge may be effectively and economically separated from the electrolyte on a continuous basis by a solids separation means comprising a container having an axis and an impeller. This system provides for the efficient generation of electrical power.

8 Claims, 3 Drawing Sheets

ELECTROLYTE RESISTANCE VS. % SOLIDS

EFFICIENT ELECTRICAL POWER GENERATION SYSTEM

This is a division of application Ser. No. 017,806 filed Mar. 5, 1987 now U.S. Pat. No. 4,719,156.

BAKGROUND OF THE INVENTION

1. Field of the Invention

This invention relates to a method for improving the efficiency of an electrical power generation system. More specifically, a power source, which includes at least one battery comprising an anode and a liquid electrolyte that contains solid particulate, is integrated with a solids separation means. The solid separation means comprises an impeller, a container having an axis and inlet and outlet means. This system provides for the highly effective continuous separation of solid particulate from the electrolyte resulting in high efficiency in electrical power generation.

2. State of the Art

The operation of certain energy or power generation systems commonly utilized a recirculating liquid. Inherent in some of these systems is the possibility of a build up of solid discharge products. Thus, in metal/air batteries, which typically use a recirculating alkaline electrolyte, a metal oxide discharge product accumulates in the electrolyte. One such system is taught in U.S. Pat. No. 4,246,324, wherein spent electrolyte containing precipitated oxides may simply be removed from the battery container through a draining nozzle.

It has been recognized, such as in U.S. Pat. No. 3,359,136, that complete energy conversion systems may employ means for separating the metal oxide from the recirculating electrolyte. As discussed in this patent, oxide removal can maintain the concentration of the oxide reaction product in the electrolyte at a sufficiently low level for recirculation of electrolyte to a power source, such as a cell stack. As also disclosed in the patent, a separator can be useful to treat a portion of recirculating electrolyte. Such separator can constitute a self-cleaning filter, although the filter may require periodic scraping.

It is disclosed in U.S. Pat. No. 3,708,345, that the mechanically separated oxide reaction product may be conveniently stored near a mechanical separator apparatus for eventual removal. As more fully discussed therein, the suspended zinc oxide reaction product which is separated, can find use as in recharging the zinc electrodes.

Impeller-fluidizers have been proposed for mixing and separating, e.g., separating at least one liquid of different densities. In U.S. Pat. No. 3,129,066 such an apParatus, containing a perforate, generally cone-shaped, solids accumulating barrier within the fluidizer container, is taught as useful for the separation of at least one solid of different density from an entraining liquid.

Also, as in U.S. patent application Ser. No. 843,055 of M. A. Petrick et al, there is described an impeller-fluidizer apparatus that can be useful for separating an entrained solid in a slurry fed to the apparatus. A product high in particulate concentration as well as one of very low particulate concentration may be produced, particularly in a cascading series of discrete fluidizer elements.

It would nevertheless be desirable if an entire power source and solids discharge separation system could be integrated to handle the continuous separation of solid particulate from the electrolyte to provide enhanced and efficient energy generation from metal/air batteries. It would also be desirable if such separator system for solids removal could operate most economically at low power requirements while integrated into such a continuous flow operation system that is operating with copious amounts of recirculating electrolyte. It would furthermore be advantageous if the system could not only operate on a continuous basis, but could do so without frequent interchange of critical elements, e.g., without interchange of used filters.

SUMMARY OF THE INVENTION

A novel method and system for improving the efficiency of electrical power generation, particularly from batteries comprising a consumable anode and a liquid electrolyte cdntaining solid particulate, has been discovered.

In accordance with the present invention, there has now been devised an efficient solids separation system useful, e.g., with metal/air batteries, which may provide for the continuous and efficient removal of solid particulate discharge products so as to maintain such products at desirably low levels in circulating electrolyte.

Further in accordance with the present invention, solids removal may be accomplished economically while providing for removal of even extremely finely divided particles.

Still further in accordance with the present invention, the system may be operated on a continuous basis while exhibiting freedom from plugging. Thus, the system does not rely on the need for interchange of critical parts, such as filters, during operation.

Still further in accordance with the present invention, the solids separation means is largely unaffected by changes in flow rate, changes in solids concentration and relatively minor changes in the specific gravity of the liquid phase.

Still further in accordance with the present invention, the solids separation means may operate with a differential pressure between the high solids concentration outlet means and the separated low solids concentration outlet means, and may further operate without a break in system pressure.

Still further in accordance with the present invention, a highly efficient electrical power generation system has been developed that is relatively small in size, light weight, operates with minimal input power requirements and is self-pumping.

Still further in accordance with the present invention, a system is provided comprising: a battery stack producing an unstable precursor material of an oxide solid in a liquid electrolyte withdrawn from the battery stack as battery effluent; an impeller-equipped container having an axis; means for conveying the battery effluent to the container; means for withdrawing solids-concentrated effluent from an annulus zone of the container; and means for withdrawing supernatant liquid from the container from a zone removed from such annulus zone, coupled with means for recycling withdrawn supernatant liquid to the battery stack.

These and other aspects of the invention will become clear to those skilled in the art upon the reading and understanding of the specification.

Figure 1:
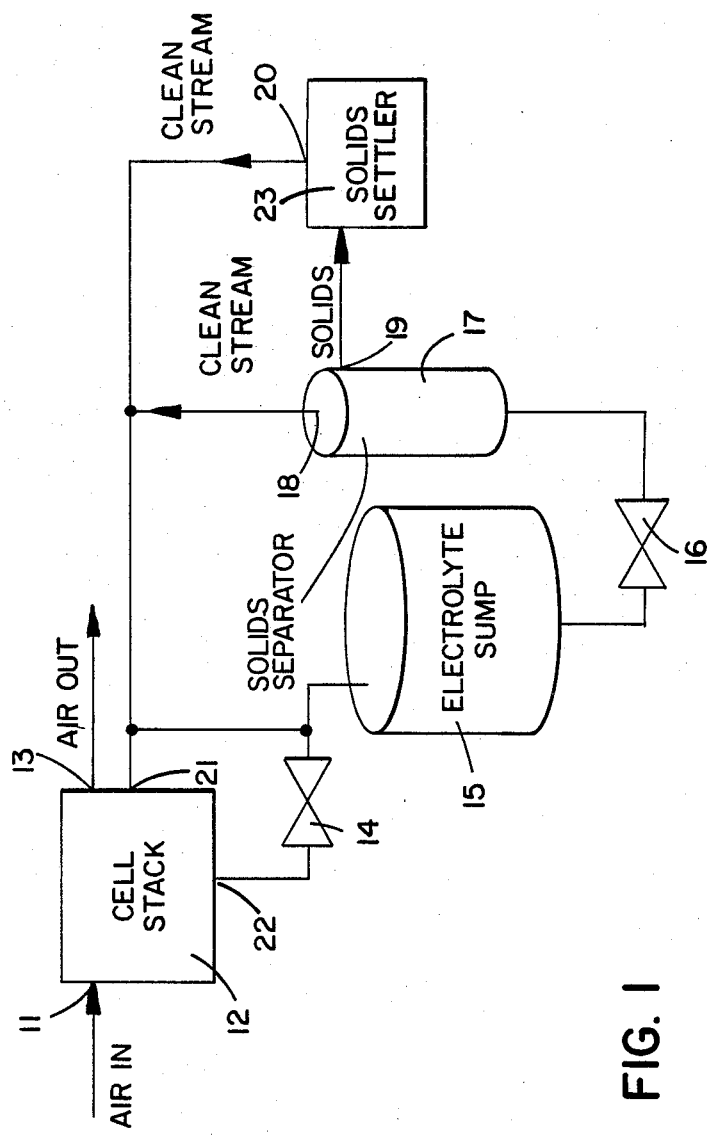
FIG. 1 is a schematic flow diagram of an electrical power generation system according to the present invention including cell units and solids discharge removal means integrated therewith.

The invention will be further described in connection with the attached drawing figures showing preferred embodiments of the invention including specific parts and arrangements of parts. It is intended that the drawings included as a part of this specification be illustrative of the preferred embodiments of the invention and should in no way be considered as a limitation on the scope of the invention.

DETAILED DESCRIPTION OF THE PREFERRED EMBODIMENTS

A highly effective system has been developed that enhances electrical power generated and improves the efficiency of the operation of batteries or electrochemical cells.

The terms electrochemical cells, or batteries, as used herein, refer to those cells for generating electrical power comprising an anode, a cathode and an electrolyte. For such cells numerous anodes and cathodes have been used. An air cathode and a metal anode, however, has been found to be particularly useful for the purposes of the present invention. Thus for convenience, such cells are often referred to herein as metal/air batteries.

It is to be understood there can be used in addition to air as the cathode such alternative sources as are known to those skilled in the art, e.g., oxygen, ammonia, chlorine and carbon dioxide.

Materials useful for the anode may be any electroconductor used in such electrochemical cells which includes metals, metalloids, alloys and heavy metal salts. It is preferred for the purposes of the present invention that the anode is a consumable material. Such metals as zinc, aluminum, lead, lithium and the like are preferred. Aluminum is the most preferred for the purposes of the present invention which includes the alloys, metalloids and intermetallic mixtures thereof. During cell operation, i.e., power generation, a solids discharge product will accumulate in the electrolyte as a by-product of the electrical power generation. As used herein, the term "solids discharge product", is intended to include any such solids as will be contained in the electrolyte upon consumption of the anode. Usually this product will consist mostly of a metal oxide. Where zinc is included in the anode metal, the solids contained in the electrolyte may be referred to as zinc oxide or zinc hydroxy complex. In the case of anodes containing aluminum, the solids discharge product will contain hydrargillite, i.e., $Al_2O_3 \cdot 3H_2O$ and similar oxide complexes.

This discharge product is formed from the unstable precursor material $MAl(OH)_4$ where M is usually K or Na depending on the electrolyte used. This precursor is produced by the electrochemical reaction at the anode. This anode reaction product is unstable and breaks down to the solids discharge product $Al_2O_3 \cdot 3H_2O$ and the electrolyte MOH. This reaction is further illustrated below.

$$2\,Al(OH)_4 \rightarrow 2OH + Al_2O_3 \cdot 3H_2O$$

The cathode will be of a porous sheet type construction. Useful cathodes include those prepared typically as a carbon/polymeric binder matrix of a lipophobic (e.g., hydrophobic) polymer. Generally, this structure will be a catalyzed carbon matrixed with particles of halocarbon polymer binders. The hydrophobic polymer will generally contribute from about 10 to about 50 weight percent of the matrix. The carbon typically is very finely divided, e.g., particles are within the range of from about 0.01 to about 0.1 micron. The halocarbon polymer binder, i.e., a fluorocarbon polymer, may be combined with other polymeric materials which also may be finely divided. The carbon in the matrixed material may be activated such as by a platinum catalyst. Such cathodes have been disclosed for example in U.S. Pat. No. 4,354,958 which is incorporated herein by reference for such disclosure.

More specifically, the internal surface of the activated porous cathode wall, that is, the surface towards the interior of the porous sheet, is impregnated with a lipophobic resin such as a polyethylene, polypropylene, polytetrafluorethylene, polychlorofluoroethylene, various vinyl resins, and the like, in such a way as to let the resin penetrate inside the pores for a certain depth from the surface but without reaching through the entire thickness of the porous cathode. The resin partially coats the surface of the pores near the internal surface of the cathode and imparts hydrophobic properties to the gas side layer of the porous cathode.

Electrolytes that are useful in the electrochemical cells of the present invention include any material or medium capable of passing electrical current, i.e., ionically conductive, and is compatible with the respective anode and cathode materials of the present invention. In other words, the electrolyte not only must be capable of passing electrical current but also must be electrochemically reactive with the anode material while being more electropositive than the cathode.

In a preferred embodiment of the present invention, the electrolyte is an alkaline solution of an alkali or alkaline earth hydroxide. Alkali metal hydroxides are the most preferred. Although the use of a particular hydroxide or blend of hydroxides may depend upon the metal constituency of the anode if the anode contains aluminum, the hydroxide of choice making up the electrolyte is KOH or NaOH.

With respect to the solids separation means, a simple means of producing locally confined fluidized beds of fine particles is used. The particles are held dynamically within a cylindrical vessel by the interaction of centrifugal force and convection, both produced by impeller-driven swirling flow. The fluidized bed is maintained in a zone adjacent to clear fluid with or without mechanical barriers such as screens. Centrifugal force, due to swirling flow, moves particles radially outward, and secondary flow sweeps them along the walls from the impeller into a rotating, torroidal bed. Clear fluid passes through the fluidized zone. Upon leaving the fluidized zone, the fluid is stripped of particles by centrifugal force. At high impeller rotation rates, the fluidized bed becomes small and sharply defined. This phenomenon may handle, without entrainment losses, particles of at least 10 times smaller than the lower limit in conventional fluidization. Mass transfer controlled processes may possibly be reduced in volume by a factor of up to 100, the gain coming from the higher surface area of the smaller particles and their more favorable mass transfer coefficients.

A very important feature of the present invention is that the solids separation means not only serves to separate the solids discharge product but also may serve as a pump to draw electrolyte into the container for separation. Therefore, the entire system may operate without any additional pumps. This is a major advantage since pumps generally require monitoring and are obviously an additional cost factor. Furthermore, this solids separation means has the additional advantage of being substantially unaffected by changes in flow rate, changes in solids concentration and relatively minor changes in the specific gravity of the liquid phase when in operation.

FIG. 1 illustrates a flow chart of a power generation system within the scope of the present invention. Cell stack 12, which comprises at least one aluminum/air battery, has air inlet 11 and outlet 13. Cell stack 12 also has electrolyte inlet 21 and outlet 22 for the continuous circulation of electrolyte within the cell stack and to the solids separation means.

Figure 2:
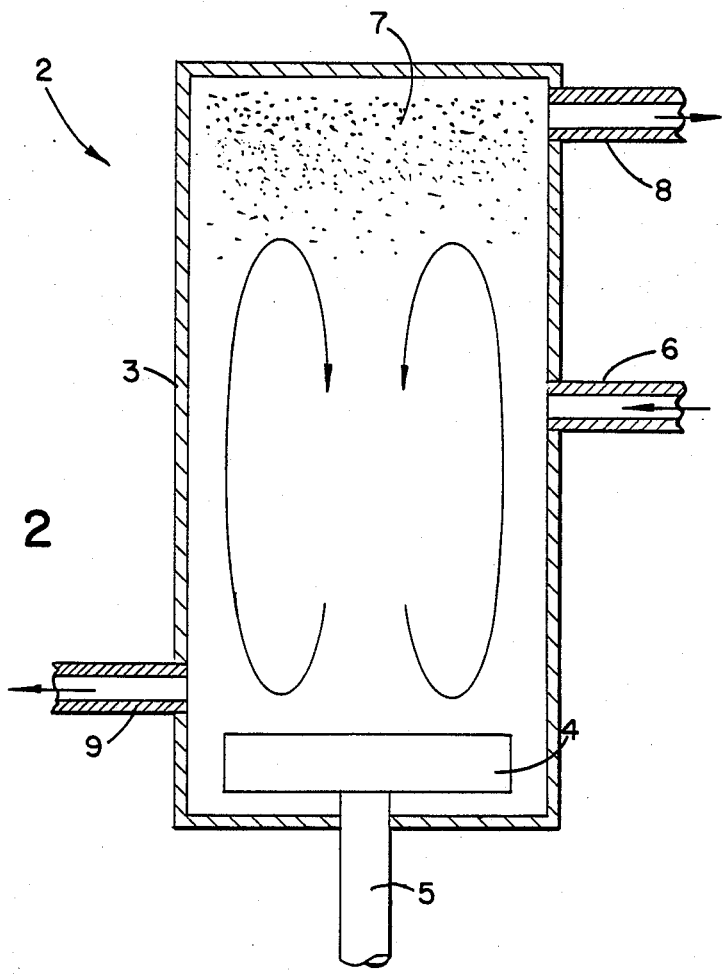
FIG. 2 is a side elevational view, partly in section, of a preferred apparatus useful in the invention solids separation system.

While the system is operating valve 14 is open and electrolyte liquid fills sump 15. Valve 16 is open to allow electrolyte to be drawn into solids separator 17 (e.g., as illustrated in FIG. 2). The electrolyte depleted of solids at 18 may be recirculated to cell stack 12. The solids containing liquid is taken off at 19 and fed to de-watering means 20. Fresh electrolyte may then be recirculated to cell stack 12 from outlet 23.

FIG. 2 illustrates an impeller fluidizer, shown generally at 2, has a cylindrical container or canister 3 equipped with an impeller 4 at the bottom of the canister 3. The impeller 4 is connected by a drive shaft 5 with a power source, not shown. A slurry inlet 6 feeds battery electrolyte effluent containing solids discharge product, from a battery stack, not shown (see FIG. 1). Within the canister 3 the solids entering through the slurry inlet 6 concentrate at the end of the canister 3 forming an annulus opposite from the impeller 4. The solids form a concentrated solids-containing zone 7 at such end. From this solids-containing zone 7 a concentrate product can be removed from the canister 3 through a solids product outlet 8. Nearer the impeller 4, supernatant electrolyte can be removed from an electrolyte product outlet 9. The electrolyte product from this outlet 9 can then be recycled to the battery stack, not shown.

The invention is further illustrated in the following examples. While these examples will show one skilled in the art how to operate within the scope of this invention, they are not to serve as a limitation on the scope of the invention where such scope is defined only in the claims.

EXAMPLE 1

For this Example, the electrolyte used was a five molar aqueous electrolyte of potassium hydroxide. The electrolyte was circulated in the system. Upon initiation of the test the electrolyte contained hydrargillite (Al$_2$O$_3$·3H$_2$O) particulate. This solid, in crystal form, has virtually all particles more finely divided, i.e., finer than 10 microns with the major portion of the particles, i.e., rreater than 50 weight percent, being more finely divided than 5 microns.

The separator used consisted of an 8 inch long by 2 inch diameter polysulfone cylinder with polysulfone end plates. The cylinder had two tangential outlet ports. One of these ports, located at the cylinder end opposite the impeller, was for the removal of concentrated slurry product. The other outlet port, adjacent the impeller was for removal of cleaned, supernatant liquid. The container also had an inlet port, at the container midsection for introducing the test electrolyte to the separator. The impeller was 1¾ inch by ½ inch by 1/16 inch nickel 200 sheet attached to a nickel shaft using nickel pins. A Hastelloy C face seal was used to seal the shaft in the polysulfone seal housing. Such impeller-fluidizer has been more particularly described in the U.S. patent application Ser. No. 843,055.

The impeller-fluidizer was operated at 7000 rpm. Under these conditions approximately 86.4 percent by weight of the heavy particles (greater than 10 microns) and 13.6 percent by weight of the lighter particles (less than 10 microns) concentrated at the end of the fluidizer away from the impeller. The balance of the mass of particles remained fluidized throughout the electrolyte, but as such, were judged to be sufficiently suppressed for recirculation of the electrolyte for use in an aluminum/air battery cell stack.

EXAMPLE II

For this Example, the same solids-separator device as described in Example I was employed. The electrolyte employed was 5M KOH and contained over 0.7 percent by weight solids. This electrolyte was circulated at a rate of 2.5 gallons per minute with 320 ml/min. discharge of solids.

The impeller-fluidizer was operated at 5000 rpm and under such conditions approximately 0.66 percent by weight of light solid particles (less than 10 microns) and 1.48 percent by weight of heavy solid particles concentrated at the end of the fluidizer away from the impeller. The balance of the mass of particles remained fluidized throughout the electrolyte, but as such, were judged to be sufficiently suppressed for recirculation of the electrolyte for use in an aluminum/air battery cell stack.

EXAMPLE III

In this Example several trials were run with an electrolyte that contained Al$_2$O$_3$·3H$_2$O having a particle size in the range of 44–150 microns and another set of trials were conducted with an electrolyte that contained Al$_2$O$_3$·3H$_2$O having an average particle size of 3.48 microns. The same solids-separato described in Example I was employed for this Example. The solids-separator device functioned as both a system pump and as a solids separation device. The results from these trials and the operation conditions are reported below in Table I. Excellent solids separation was obtained for the larger particles. Poorer separation of the smaller particles was obtained, however this may be improved by operating the device at a higher rpm.

TABLE I

| Particle Size | Test No. | % Solids Conc Stream / % Solids Dilute Stream | Flowrate Conc Stream / Flowrate Dilute Stream |
| --- | --- | --- | --- |
| 44–150 microns | 1 | 17.9[1]:1 | 0.36:1 |
|  | 1 (repeat) | 16.1[1]:1 | 0.37:1 |

TABLE I-continued

| Particle Size | Test No. | % Solids Conc Stream / % Solids Dilute Stream | Flowrate Conc Stream / Flowrate Dilute Stream |
|---|---|---|---|
| 44–150 microns | 2 | 48.9[1]:1 | 0.17:1 |
| 3.48 microns | 3 | 1.7[2]:1 | 0.41:1 |
| 3.48 microns | 4 | 2.3[2]:1 | 0.17:1 |

[1] Weight % of heavier particles (i.e., larger particles) removed.
[2] Weight % of lighter particles (i.e., smaller particles) remaining in electrolyte after separation. The ratios shown illustrate the efficiency at which the device is separating (i.e., concentrating) the solids. The ratio of the concentrated to dilute flowrates has a large effect on the separation efficiency. At lower flowrates, the heavier particles have a longer residence time in the solids separator and, in turn, the efficiency is enhanced.

EXAMPLE IV

Figure 3:
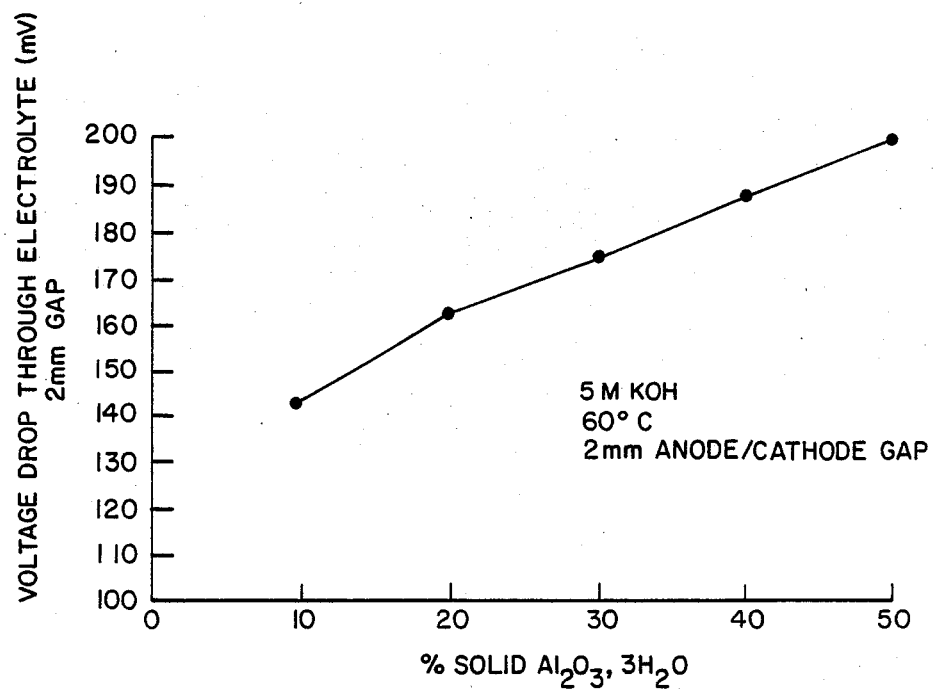
FIG. 3 is a graph illustrating how the electrolyte conductivity is reduced as a function of solids concentration.

An aluminum/air battery was tested to illustrate the reduction in operating voltage with increasing solids content in the electrolyte. The initial trial was conducted using 5M KOH electrolyte having no dissolved aluminum or solid alumina. Solid alumina ($Al_2O_3 \cdot 3H_2O$) particles of approximately 3.48 micron size were slurried with the electrolyte at 60 degrees centigrade. Conductivity measurements were taken with a Foxboro conductivity meter at different solids concentration levels. From the conductivity values, an electrolyte ir drop based on a 2 mm anode/cathode gap was calculated. The graph of FIG. 3 shows how the electrolyte conductivity is reduced as a function of solids concentration. This is represented as an electrolyte ir drop. Voltage is the sum of the cathode potential, anode potential, and electrolyte ir.

In addition to reduction of the electrolyte conductivity, some other practical problems arising from high solids content in an electrical power generation system are:

1. Scaling of the process equipment, especially the heat exchanger thus reducing heat exchanger efficiency.
2. Destruction of the valve seats, etc. by the abrasive action of the alumina.
3. Physical damage to the air cathodes due to the abrasiveness of the alumina.
4. Plugging of all the electrolyte inlet orifices.
5. Increased pumping energy required by the increased viscosity of electrolyte.

While the invention has been described and illustrated with reference to certain preferred embodiments thereof, those skilled in the art will appreciate that various changes, modifications and substitutions can be made therein without departing from the spirit of the invention. For example, the system and process may be utilized with most means that produce solid particulate in a circulating liquid medium and that requires the solid particulate be removed from the liquid medium. It is intended, therefore, that the invention be limited only by the scope of the claims which follow.

What is claimed is:

1. An efficient, electrical power source comprising:
   at least one battery comprising a metal electrode and a liquid electrolyte containing solid particulate;
   a solid separation means comprising a container having an axis and an impeller;
   means for conveying said liquid electrolyte to said container;
   means for withdrawing solids concentrated effluent from an annulus zone of fluid within said container opposite from the end of said container containing said impeller; and
   means for withdrawing supernatent liquids from said container from a zone removed from said annuls zone, coupled with means for recycling withdrawn supernatent liquid to said battery.

2. The power source according to claim 1, wherein said metal electrode is aluminum and the cathode is an air cathode, and said solid particulate comprises a metal hydroxy complex.

3. The power source according to claim 2, wherein said electrolyte comprises an unstable precursor to said complex and said solid separation means accelerates the instability of said precursor.

4. The power source according to claim 2, wherein said electrolyte is alkaline and comprises hydrargillite for separation by said solid separation means.

5. The power source according to claim 4, wherein said impeller is operated at a speed sufficient to concentrate said particulate in an annulus zone of fluid within said container opposite from the end of said container containing said impeller.

6. The power source according to claim 1, wherein said source comprises a stack of multiple batteries.

7. The power source according to claim 1, wherein aid solid separation means is self-pumping whereby the system may operate without any additional pumps.

8. The power source according to claim 1 wherein said solids separation means is substantially unaffected by changes in flow rate, changes in solids concentration and relatively minor changes in the specific gravity of the liquid phase.

* * * * *